United States Patent Office 3,823,160
Patented July 9, 1974

3,823,160
PREPARATION OF ETHER ADDUCTS OF
N-VINYL-2-PYRROLIDONE
Richard F. Smith, Morristown, N.J., assignor to
GAF Corporation, New York, N.Y.
No Drawing. Filed Oct. 4, 1971, Ser. No. 186,489
Int. Cl. C07d 27/08
U.S. Cl. 260—326.5 FL    7 Claims

ABSTRACT OF THE DISCLOSURE

Process for the preparation of ether adducts of N-vinyl-2-pyrrolidone having the general formula:

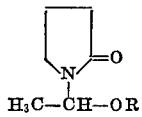

wherein R is the residuum of an active hydroxyl-containing compound free of functional groups which are additively reactive with a double bond under the reaction conditions, comprising admixing an alcohol and a catalytically effective amount of an alcohol soluble organic acid or salt of aluminum, boron, calcium, iron, gallium, rhodium, palladium, tin or mercury, admixing vinyl pyrrolidone therewith at a rate sufficient to maintain the reaction temperature within the range of from about 0° C. to about 100° C. and thereafter, recovering said ether adduct. Novel ether adducts of N-vinyl-2-pyrrolidone having the general formula:

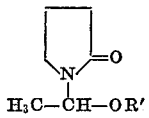

wherein R' is a cyclic or acyclic aliphatic hydrocarbon radical containing from 5 to about 20 carbon atoms are also provided.

---

This invention relates to ether aducts of N-vinyl-2-pyrrolidone and to processes for the preparation thereof. More particularly, this invention relates to ether adducts of N-vinyl-2-pyrrolidone produced by a catalytic process whereby an alcohol is alkylated with N-vinyl-2-pyrrolidone.

Ether adducts of N-vinyl-2-pyrrolidone having the general formula:

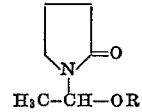

wherein R is the residuum of an active hydroxyl-containing compound free of functional groups which are additively reactive with a double bond under the conditions employed in the preparation thereof, contain both an ether function and a N-substituted lactam. As such, these compounds have been found useful as solvents for polymers, insecticides, pesticides and the like. The higher molecular weight derivatives produced in accordance with the present invention exhibit surfactant properties. Moreover, these higher molecular weight adducts exhibit activity as agricultural chemicals, particularly as herbicides useful in the control of aquatic and terrestrial weeds. Still further, these adducts have been found useful as corrosion inhibitors.

N-(α-lower alkoxyethyl)-2-pyrrolidones, i.e., those wherein the alkoxy group contains 1 to 4 carbon atoms, have heretofore been prepared. M. F. Shostakovskii et al., Izvest. Akad, Nauk S.S.S.R., Otdel, Khim. Nauk, 516-20 (1959), C.A. 53, 18937g (1959) describe the preparation of N-(α-lower alkoxyethyl)-2-pyrrolidones by admixing N-vinyl-2-pyrrolidone with a lower alkanol. Dry HCl or trace amounts of concentrated HCl is then added to the reaction mixture. After 1 to 1.5 minutes, an exotherm of 80° to 130° C. is generated. This exotherm is difficult to control and conducting the reaction at these elevated temperatures causes polymerization of the vinyl compounds, formation of vinyl dimers and dehydration of the alcohols. These accompanying side reactions at elevated temperatures, of necessity, decrease the yields of desired product. Moreover, it has been found that when this procedure is employed with higher molecular weight alcohols, these problems become even more acute.

Accordingly, it is an object of the present invention to provide a process which will enable the formation of ether adducts of N-vinyl-2-pyrrolidone including those wherein high molecular weight alcohols are employed without the generation of an exotherm, thereby removing the need for external cooling which poses a severe problem upon scale-up.

It is another object of the present invention to provide catalytic processes for the preparation of ether adducts of N-vinyl-2-pyrrolidone in excellent yields under mild conditions.

It is still another object of the present invention to provide novel ether adducts of N-vinyl-2-pyrrolidone.

These as well as other objects are accomplished by the present invention which in one embodiment provides a process for the preparation of ether adducts of N-vinyl-2-pyrrolidone having the general formula:

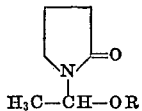

wherein R is the residuum of an active hydroxyl-containing compound free of functional groups which are additively reactive with a double bond under the reaction conditions, comprising admixing an alcohol and a catalytically effective amount of an alcohol soluble organic acid or salt of aluminum, boron, calcium, iron, gallium, rhodium, palladium, tin or mercury, admixing vinyl pyrrolidone therewith at a rate sufficient to maintain the reaction temperature within the range of from about 0° C. to about 100° C. and thereafter, recovering said ether adduct.

In another embodiment of the present invention, novel ether adducts of N-vinyl-pyrrolidone are provided having the general formula:

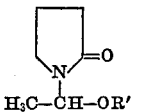

wherein R' is a cyclic or acyclic aliphatic hydrocarbon radical containing from 5 to about 20 carbon atoms.

As employed herein the term "aliphatic hydrocarbon radical" is intended to encompass both cyclic and acyclic aliphatic hydrocarbon radicals as well as substituted aliphatic hydrocarbon radicals such as hydroxy aliphatics, halo aliphatics, amino aliphatics, alkoxy aliphatics, alkaryloxy poly(alkyleneoxy)aliphatics, alkaryloxy aliphatics, haloaryloxy aliphatics and heterocyclic substituted aliphatics such as pyrrolidonyl aliphatics and the like.

It has been found in the present invention that use of alcohol soluble organic acids or alcohol soluble salts of specific metals as catalysts for the addition reaction enables the reaction to be conducted under extremely mild conditions with the obtainment of high yields of the desired adduct. Moreover, it has been found that the order of addition of the reactants is quite critical in avoiding the exotherm which plagued the prior art methods and gave rise to accompanying side reactions. In the present invention, the organic acid or metal salt catalyst is dissolved in an alcohol which provides the desired ether residuum of the adduct to be formed. Vinyl pyrrolidone is then added to the reaction medium thereby enabling control of the reaction temperature to be obtained through control of the rate of addition of the vinyl pyrrolidone. Employing the process of the present invention, ether adducts of N-vinyl-2-pyrrolidones can be obtained with a degree of purity which has heretofore been unobtainable.

N-vinyl-2-pyrrolidone is a well known, commercially available compound and can be employed diversely in its commercially obtained condition.

The process of the present invention can be employed to prepare adducts with a wide variety of alcohols. For example, acyclic saturated aliphatic alcohols such as methanol, ethanol, n-propanol, iso-propanol, n-butanol, sec.-butanol, tert-butanol, pentanol, hexanol, heptanol, n-octanol, iso-octanol, lauryl alcohol, cetyl alcohol, stearyl alcohol, decyl alcohol, tridecyl alcohol and the like; cyclic saturated and unsaturated aliphatic alcohols such as cyclopentanol, cyclohexanol, 2-hydroxymethyl-5-norbornene and the like; acyclic unsaturated aliphatic alcohols such as the alkenyl alcohols, as for example allyl alcohol, crotyl alcohol, β-hydroxyethyl methylmethacrylate, methyl vinyl carbinol, as well as alkynyl alcohols such as propargyl alcohol; hydroxy aliphatic alcohols such as butynediol, butenediol, butanediol, ethylene glycol, pentaerythritol; haloaliphatic alcohols such as chloroethyl alcohol, 1,2-dihydroxy-3-chloropropane; aminoaliphatic alcohols such as dimethylaminoethyl alcohol; alkoxy aliphatic alcohols such as 2-ethoxyethanol; alkaryloxy poly-(alkyleneoxy)aliphatic alcohols such as octylphenoxy poly(ethyleneoxy)ethanol, nonylphenoxy poly(ethyleneoxy)ethanol and the like; alkaryloxy aliphatic alcohols such as p-nonylphenoxy ethanol; haloaryloxy aliphatic alcohols such as 2,4-di or 2,4,5-trichlorophenoxy ethanol; heterocyclic substituted aliphatic alcohols such as N-(hydroxy methyl)pyrrolidone and the like. The above examples, offered by way of illustration and non limitative, serve simply to illustrate the wide range of alcohols which can be suitably employed in the present invention. Primary, secondary, and tertiary as well as polyfunctional alcohols can be employed as long as said functional groups are not additively reactive with a double bond under the reaction conditions.

In accordance with the present invention, the addition of N-vinyl-2-pyrrolidone to the broad class of alcohols described hereinabove is affected in the presence of catalysts comprising alcohol soluble organic acids or alcohol soluble salts of certain metals. Suitable organic acids include, for example, carboxylic acids such as acetic acid, butyric acid, caproic acid, lauric acid, palmitic acid, stearic acid, oleic acid, benzoic acid, phenylacetic acid and the like, as well as sulfonic acids as, for example, p-toluene sulfonic acid, benzene sulfonic acid and the like. Suitable metal salts include the halides, sulfates and other alcohol soluble salts of iron, mercury, palladium, rhodium, aluminum, tin, gallium, boron and calcium, for example, boron trifluoride, aluminum chloride, aluminum bromide, aluminum sulfate, ferric chloride, rhodium sulfate, stannic chloride, stannous chloride, calcium sulfate, ferrous chloride, palladium chloride, gallium sulfate and the like. Catalytically effective amounts of the catalyst will vary depending upon the reactivity of the alcohol and upon the desired reaction temperature. Generally, however, it has been found that from about 0.2 to about 5% by weight of catalyst based on the weight of vinyl pyrrolidone is suitable. It has been found that the metal salts which show catalytic activity can be used either in an anhydrous or hydrous form. Water of hydration retards the reaction somewhat, but does not affect overall yields.

The alcohol and N-vinyl-2-pyrrolidone are reacted upon an equi-molar basis in accordance with the reaction stoichiometry; however, if desired more or less of either reactant can be employed.

In order to avoid the exotherm which has heretofore plagued the prior art, it has been found that a specific order of addition of the reactants is critical. Thus, the catalyst, whether organic acid or metal salt, is first dissolved in the desired alcohol. Thereafter, the reaction system is heated to temperatures ranging between about 0° C. and 100° C.; then, vinyl pyrrolidone is added to the reaction medium at a rate sufficient to maintain the reaction temperature within the desired range of from 0° C. to about 100° C., and preferably at a rate sufficient to maintain the reaction temperature between about 40° C. and about 60° C. The course of the addition can be followed by titrating the unreacted vinyl pyrrolidone and/or by infrared measurements of the reaction medium. Generally, the addition reaction goes to completion within about two hours, although longer or shorter periods of time can be employed depending upon the particular reactants and conditions.

Upon completion of the reaction, a neutralizing agent such as sodium carbonate can be added to neutralize the acid catalyst when such catalysts are employed. The ether adduct product can be obtained by separation from the solids, e.g., salts formed in the reaction, by filtration, distillation, or recrystallization. In the case of the lower molecular weight adducts, e.g., up to about the $C_8$ aliphatic ether adducts, the product can be generally recovered by distillation at reduced pressure. The higher molecular weight adducts are generally non-distillable and can be conveniently recrystallized from solvent solutions thereof.

Although not considered necessary, the process can be conducted employing solvents or diluents which are inert under the reaction conditions. The suitability of a particular solvent can be easily determined by the solubility of the alcohol and vinyl pyrrolidone in said solvent. Typical solvents which can be satisfactorily employed include aromatic hydrocarbons such as benzene, toluene and the like, ethers such as diethyl ether, tetrahydrofuran and the like, ketones such as methyl ethyl ketone, methyl isobutyl ketone and the like, as well as esters such as ethyl acetate and the like.

The reaction temperature can vary widely. It has been found that the selectivity of the reaction decreases with increasing temperature. Conversely, as the temperature is reduced, the rate of reaction decreases. Thus, it has been found that the reaction can be advantageously conducted between about 0° C. and about 100° C., and preferably between about 40° C. and about 60° C. Most advantageously, the reaction is conducted under ambient conditions of both temperature and pressure. Although the reaction can be conducted under atmospheric pressure, superatmospheric pressure can also be used if desired.

Although not wishing to be bound by any theory or mechanism, it is currently believed that the catalytic activity obtained through use of the above-described organic acids or metal salts is not due to simple Lewis acid catalysis; for example, zinc, magnesium, aluminum and iron salts are all strong Lewis acids, but magnesium and zinc show no activity in this reaction at all; whereas, in the presence of iron, the reaction is completed within two hours, while employing aluminum salts, the reaction takes almost three days to reach completion.

The following examples further define, describe and compare methods of preparing the ether adducts of N-vinyl-2-pyrrolidone of the present invention. The use of such compounds in various applications is also illustrated. Parts and percentages are by weight unless otherwise indicated.

EXAMPLE 1

Preparation of N-(α-methoxyethyl)-2-pyrrolidone p-Toluene sulfonic acid in an amount of one weight percent based on the weight of N-vinyl-2-pyrrolidone was dissolved in 1.0 mole of methanol. The reaction mixture was heated to 40° C. and 1.0 mole of vinyl pyrrolidone was added at such a rate as to maintain the 40° C. reaction temperature. The unreacted vinyl pyrrolidone dropped to 2% within three minutes after mixing. The acid was neutralized with sodium carbonate and the solids were removed by filtration. N-(α-methoxyethyl)-2-pyrrolidone was obtained in 97% yield.

EXAMPLE 2

Preparation of N-(α-propynoxyethyl)-2-pyrrolidone 0.045 Mole of p-toluene sulfonic acid was dissolved in 9 moles of propargyl alcohol. The reaction medium was maintained at 16° C. to 17° C. during the dropwise addition of 9 moles of N-vinyl-2-pyrrolidone. Thereafter the reaction mixture was stirred for two hours. Upon completion of the reaction, the acid was neutralized with sodium carbonate and the solids were removed by filtration to yield 96% of N-(α-propynoxyethyl)-2-pyrrolidone.

EXAMPLE 3

Preparation of N-(α-octadecyloxyethyl)-2-pyrrolidone

Two moles of stearyl alcohol were dissolved in 750 milliliters of benzene containing 0.01 mole of p-toluene sulfonic acid. 2.0 Moles of vinyl pyrrolidone were added dropwise to the reaction medium over a period of two hours at a rate sufficient to maintain the temperature of the reaction medium at about 34° C. Upon completion of the reaction, sodium carbonate was added to the reaction medium to neutralize the acid. The solids in the reaction medium were removed by filtration and the benzene solvent was stripped off at reduced pressure. The product, N - (α-octadecyloxyethyl)-2-pyrrolidone, was purified by freeze drying and was ultimately recovered in 99.7% yield.

EXAMPLE 4

Preparation of N-(α-[2,4,5-trichlorophenoxyethoxy]-ethyl)-2-pyrrolidone 0.2 Mole of 2,4,5-trichlorophenoxyethanol was dissolved in 50 cc. of tetrahydrofuran containing 0.82% by weight based on the weight of vinyl pyrrolidone of p-toluene sulfonic acid. 0.2 Mole of vinyl pyrrolidone was added to the reaction medium in a dropwise fashion at a rate sufficient to maintain the reaction temperature at 40° C. The reaction was conducted for a total of three hours. Thereafter, sodium carbonate was added to neutralize the acid. The solids in the reaction medium were removed by filtration and the tetrahydrofuran was stripped off at reduced pressure. Based on vinyl pyrrolidone used, the product was produced in 98.2% yield after 1 hour.

EXAMPLE 5

Preparation of N-(α-methoxyethyl)-2-pyrrolidone 1.0 Gram of anhydrous ferric chloride was dissolved in 32 grams of methanol and the resulting reaction medium was warmed to 40° C. Thereafter, 111.15 grams of vinyl pyrrolidone was added to the reaction mixture dropwise. After three hours at 40° C., the reaction had gone to 98.8% completion.

EXAMPLE 6

Preparation of N-(α-methoxyethyl)-2-pyrrolidone with $FeCl_3 \cdot 6H_2O$ 1.0 Gram of hydrated ferric chloride ($FeCl_3 \cdot 6H_2O$) was dissolved in 1.0 mole of methanol. The mixture was heated to 40° C. and 1.0 mole of vinyl pyrrolidone was added dropwise. After four hours at 40° C., a 98.7% reaction was achieved.

EXAMPLE 7

Preparation of N-(α-methoxyethyl)-2-pyrrolidone with soluble salts of palladium 1.0 Gram samples of $K_2PdCl_4, PdCl_2 \cdot (\phi CN)_2$ were respectively dissolved in 1.0 mole of methanol. Each of the resulting reaction mixtures was heated to 40° C. and 1.0 mole of vinyl pyrrolidone was added to each dropwise. In each instance, the reaction was essentially complete in two hours. N - (α-methoxyethyl)-2-pyrrolidone was obtained in respective yields of 94.4% and 95.8% after 1 hour.

EXAMPLE 8

Preparation of N-(α-methoxyethyl)-2-pyrrolidone with gallium sulfate 1.0 Gram of gallium sulfate was dissolved in 1.0 mole of methanol. The mixture was heated to 40° C. and 1.0 mole of vinyl pyrrolidone was added dropwise. The reaction was essentially complete in three hours. N-(α-methoxyethyl)-2-pyrrolidone was obtained in 94.5% yield after two hours.

EXAMPLES 9–22

Employing the procedure described in Example 1, ether adducts of N-vinyl-2-pyrrolidone were prepared with a wide variety of cyclic and acyclic, saturated and unsaturated aliphatic alcohols. The results obtained are summarized in Table I below. In all instances, regardless of the reactivity of the alcohol, the concentration of unreacted vinyl pyrrolidone dropped to a low value within one hour after addition. The low concentration of unreacted alcohol in the reaction product is evidence of the negligible by-product formation encountered in this invention. Infrared studies of the reaction mixtures showed no appreciable change after 7 days under reaction conditions. Therefore, the reaction equilibrium is strongly in favor of the ether aducts. Unless otherwise noted, the molar ratio of alcohol to vinyl pyrrolidone was 1/1.

TABLE I

Preparation of ether adducts of N-vinyl-2-pyrrolidone

| Example | Alcohol (ROH) | Reaction time (hr.) | Percent OH (gm.-atom) | Moles ROH[1] | Percent conversion by (OH) No. |
|---|---|---|---|---|---|
| 9 | Methanol | 19 | 1.1 | 0.1 | 90 |
| 10 | 1,4-butanediol [2] | 36 | 4.0 | 0.37 | 100 |
| 11 | β-Hydroxy ethylmethyl methacrylate | 1.3 | 2.5 | 0.40 | 60 |
| 12 | Propargyl alcohol | 22 | | | |
| 13 | do | 1.5 | | | |
| 14 | Butynediol | 22 | 1.7 | 0.1 | 90 |
| 15 | n-Octadecanol | 2 | 1.3 | 0.29 | 71 |
| 16 | n-Octanol | 2 | 0.79 | 0.11 | 89 |
| 17 | n-Butanol | 2 | 1.25 | 0.14 | 86 |
| 18 | Cyclohexanol | 5 | 1.6 | 0.20 | 80 |
| 19 | n-Dodecanol | 6 | 2.0 | 0.35 | 65 |
| 20 | t-Butanol | [3] 700 | 1.5 | 0.25 | 75 |
| 21 | Nonylphenoxypoly(ethyleneoxy)ethanol | 19 | 0.42 | 0.17 | 83 |
| 22 | do | 96 | 0.48 | 0.21 | 79 |

[1] Unreacted ROH in reaction mixture.
[2] Mole ratio ROH/VP=1.4/2.
[3] Mole ratio ROH/VP=2/1.

EXAMPLE 23

Use of Ether Adducts of N-vinyl-2-pyrrolidone as solvents for various biocides Many commercial biocides exist in solid form. It is economically desirable to apply them to field crops in the form of concentrated solutions. The solvents chosen for this application should be those that do not deleteriously effect crops, yet which offer a high degree of solubility for the biocide.

A variety of N-(alkoxyethyl)pyrrolidones were evaluated for their ability to dissolve a variety of commercial insecticides and herbicides. Weighed increments of the ether adducts were added to glass vials containing exactly 2.00 grams of biocide. Solvent increments were adjusted to provide weight percent solutions ranging from 80% down to 30% covering every 10% total concentration decrease. Upon addition of each increment, the vials were manually shaken or swirled several times, than observed. In the absence of indication of at least partial solubility, successive solvent increments were added until clear solutions were obtained. At this point, additional biocide was added which would increase the concentration by 5%, and the two phase samples were mounted on a large rotating wheel (30 inch diameter, 3.5 r.p.m.) located in a constant temperature room (72° F. ±3°). After overnight rotation on the wheel, the samples were observed. In cases where a completely clear solution resulted, additional biocide was added to further increase the concentration by 5%. Weight percent solubilities are reported herein at the highest multiple of five level where a completely clear solution was obtained. Thus, a solubility reported at 50% is intended to mean an actual solubility between 50% and 55% at 72° F.

The results obtained are reported in Table II below:

TABLE II

Solubilities of biocides in ether adducts of N-vinyl-2-pyrrolidone wt. percent solubility of biocide at 72° F.

| Compound | Aldrin [1] | Dieldrin [2] | Heptachlor [3] | Lindane [4] | Sevin [5] | Toxaphene [6] | 2,4-D [7] | D.D.T. [8] |
|---|---|---|---|---|---|---|---|---|
| N-(1'-methoxyethyl)-2-pyrrolidone | 55 | 40 | 55 | 45 | <30 | 80 | 55 | 50 |
| N-(1'-ethoxyethyl)-2-pyrrolidone | 55 | 40 | 55 | 40 | <30 | 75 | 50 | 50 |
| N-(1'-isopropoxyethyl)-2-pyrrolidone | 55 | 40 | 50 | 40 | <30 | 75 | 50 | 45 |
| N-(1'-tert-butoxyethyl)-2-pyrrolidone | <30 | <30 | <40 | <40 | <40 | 45 | <40 | 40 |
| N-(1'-butoxyethyl)-2-pyrrolidone | 45 | 35 | 50 | 35 | <30 | 65 | 45 | 45 |
| N-(1'-isooctoxyethyl)-2-pyrrolidone | 30 | <30 | 40 | <30 | <30 | 55 | 35 | 30 |
| N-(1'-chloroethyleneoxyethyl)-2-pyrrolidone | 30 | <30 | 35 | 35 | <30 | 35 | 40 | 30 |

[1] 1,2,3,4,10,10-hexachloro-1,4,4a,5,8,8a-hexahydro-1,4-endoexo-5,8-dimethanonaphthalene (Shell Chem. Co.).
[2] 1,2,3,4,10,10-hexachloro-6,7-epoxy-1,4,4a,5,6,7,8,8a-octahydro-1,4-endoexo-5,8-dimethanonaphthalene (Shell Chem. Co.).
[3] 1,4,5,6,7,8,8-heptachloro-3a,4,7,7a-tetrahydro-4,7-methanoindene (Velsicol Chem. Corp.).
[4] 1,2,3,4,5,6-hexachlorocyclohexane, gamma isomer (Hooker Chem. Corp.).
[5] 1-naphthyl-N-methylcarbamate (Union Carbide Corp.).
[6] Chlorinated camphene with 67-69% chlorine (Hercules Inc.).
[7] 2,4-dichlorophenoxyacetic acid (Monsanto Co.).
[8] 1,1,1-trichloro-2,2-bis(p-chlorophenyl)-ethane (Lebanon Chem. Corp.).

When these solutions were applied to field crops no adverse effect was observed which could be attributable to the solvents employed.

EXAMPLE 24

Preparation of N-(α-octyloxyethyl)-2-pyrrolidone 0.005 Mole of para-toluene sulfonic acid was dissolved in 1.0 mole of n-octanol. The reaction mixture was heated to 40° C. and 1.0 mole of vinyl pyrrolidone was added at a sufficient rate to maintain the reaction mixture at 40° C. The reaction was continued for two hours. The acid was neutralized with sodium carbonate and the solids were removed by filtration. The resulting product was obtained in 98% conversion.

EXAMPLE 25

Use of N-(α-octyloxyethyl)-2-pyrrolidone as a selective terrestrial herbicide N-(α-octyloxyethyl-2-pyrrolidone dispersed in an inert agriculturally acceptable vehicle was sprayed at a rate of 8 pounds active ingredient per acre on a flat of recently emerged crabgrass. At the end of two weeks, the crabgrass had gone through foliage burn and became necrotic and 100% had died. Five other common and prevalent grasses similarly treated were either only slightly burned or were not effected at all. This example illustrates the potent herbicidal activity of N-(α-octyloxyethyl)-2-pyrrolidone for crabgrass as well as its selective action.

EXAMPLE 26

Use of N-(α-octyloxyethyl)-2-pyrrolidone for aquatic weed control

N-(α-octyloxyethyl-2-pyrrolidone was dispersed in water in a concentration of five parts of active ingredient per million parts of water. This composition was sprayed over water containing actively growing potamogeton, an aquatic weed. After three weeks, all the potamogeton subjected to the spray had died. Thus N-(α-octyloxyethyl)-2-pyrrolidone in as low a concentration as five parts per million exhibits potent aquatic herbicidal activity.

Although specific materials and conditions were set forth in the above exemplary processes in making and using the ether adducts of N-vinyl-2-pyrrolidone of the present invention, these are merely intended as illustrations of the present invention. Various other alcohols, solvents, reaction conditions, and applications such as those listed above can be substituted in the examples with similar results.

Other modifications of the present invention will occur to those skilled in the art upon a reading of the present disclosure. These are intended to be included with the scope of this invention.

What is claimed is:

1. A process for the preparation of an ether adduct of N-vinyl-2-pyrrolidone comprising admixing an alcohol devoid of groups additively reactive with a double bond under the following reaction conditions and selected from the group consisting of acyclic and cyclic saturated and unsaturated aliphatic alcohols, such alcohols substituted by a radical selected from the group consisting of hydroxy, halo, amino, alkoxy, alkaryloxy poly(alkyleneoxy), alkaryloxy, and haloaryloxy, and N-(hydroxymethyl)pyrrolidone, with about 0.2 to about 5%, based on the weight of the N-vinyl-2-pyrrolidone, of a catalyst selected from the group consisting of p-toluene sulfonic acid, benzene sulfonic acid, alcohol soluble carboxylic acids, and alcohol soluble salts of a metal seelcted from the group consisting of aluminum, boron, calcium, iron, gallium, rhodium, palladium, tin, and mercury, admixing N-vinyl-2-pyrrolidone with the resulting admixture at a rate sufficient to maintain the reaction temperature within the range of about 0° C. to about 100° C., and thereafter recovering the ether adduct of the formula

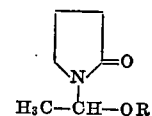

wherein R represents the residue of said alcohol containing up to 20 carbon atoms.

2. A process as defined in claim 1 wherein said catalyst is p-toluene sulfonic acid.

3. A process as defined in claim 1 wherein said catalyst is ferric chloride.

4. A process as defined in claim 1 wherein said alcohol is methanol.

5. A process as defined in claim 1 wherein said alcohol is stearyl alcohol.

6. A process as defined in claim 1 wherein said alcohol is n-octanol.

7. A process as defined in claim 1 wherein said alcohol is propargyl alcohol.

References Cited

Shostakovskii, et al., *Chem. Abs.*, vol. 55: 27267–68 (1961).

JOSEPH A. NARCAVAGE, Primary Examiner

U.S. Cl. X.R.

71—95; 424—274